US006532002B2

(12) United States Patent
Segalle

(10) Patent No.: US 6,532,002 B2
(45) Date of Patent: *Mar. 11, 2003

(54) ORTHOPEDIC COMPUTER MOUSE

(75) Inventor: Julio Abel Segalle, Sao Paulo (BR)

(73) Assignee: Jacques Cobbeni, Sao Paulo (BR)

( * ) Notice: Subject to any disclaimer, the term of this patent is extended or adjusted under 35 U.S.C. 154(b) by 0 days.

This patent is subject to a terminal disclaimer.

(21) Appl. No.: 09/932,391

(22) Filed: Aug. 17, 2001

(65) Prior Publication Data

US 2001/0052894 A1 Dec. 20, 2001

Related U.S. Application Data

(63) Continuation of application No. 09/325,001, filed on Jun. 2, 1999.

(30) Foreign Application Priority Data

Oct. 16, 1998 (AR) .......................................... M105179

(51) Int. Cl.7 ................................................ G09G 5/08
(52) U.S. Cl. ....................................................... 345/163
(58) Field of Search ................................ 345/163, 164, 345/156, 157, 165, 179, 170, 166

(56) References Cited

U.S. PATENT DOCUMENTS 5,355,147 A * 10/1994 Lear ........................... 345/156
5,894,303 A * 4/1999 Barr ........................... 345/163
6,362,811 B1 * 3/2002 Edwards et al. ............ 345/163
2002/0105500 A1 * 8/2002 Edwards et al. ............ 345/163

* cited by examiner

Primary Examiner—Xiag Wu
Assistant Examiner—Ronald Laneau
(74) Attorney, Agent, or Firm—Darby & Darby

(57) ABSTRACT

An orthopedic computer mouse which can be translated over a support surface, the mouse adapted for supporting the hand in the "physiological position" or "position of function". The proposed shape was obtained from a mold of the human hand, and the mold was realized in the "position of function." This position forces the user's hand to be placed in a position of function, thus eliminating the possibility of diseases. The present invention provides an orthopedic computer mouse which is "innocuous," i.e., a computer mouse which has no adverse effect on, or which is harmless to the user. The mouse comprises a bottom surface, a forward end, a rear end, and opposite sides, and a generally hemispherical surface for supporting the fingers of a hand in a generally elevated orientation relative to the support surface with the little finger at a first elevation and the index finger located at a second elevation higher than the first elevation relative to the bottom surface. The generally hemispherical surface is further adapted for supporting the hollow of the hand so that the hand rests at an angle with respect to the forearm in the physiological position. The general hemispherical finger-supporting surface extends upwardly and laterally from one of the opposite sides. A thumb-supporting surface is provided for supporting the thumb of the hand, so that the mouse is securely gripped between the thumb and the fingers, the thumb supporting surface being disposed opposite the generally hemispherical finger-supporting surface.

7 Claims, 6 Drawing Sheets

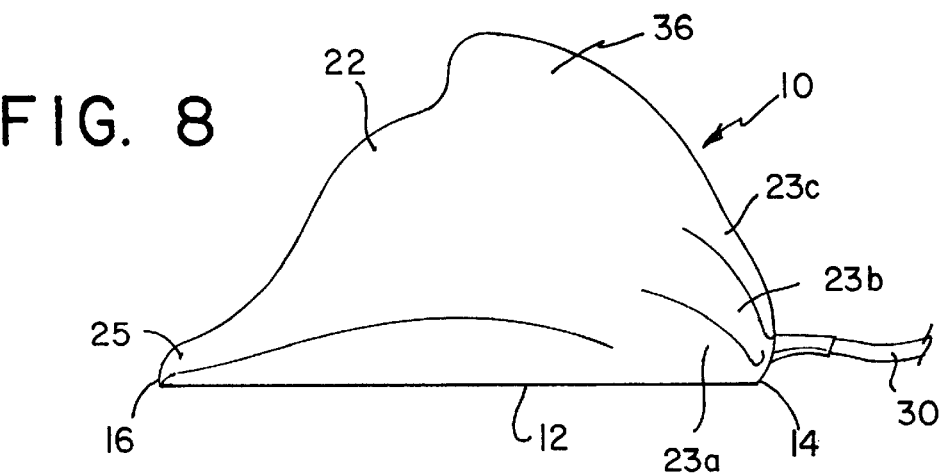
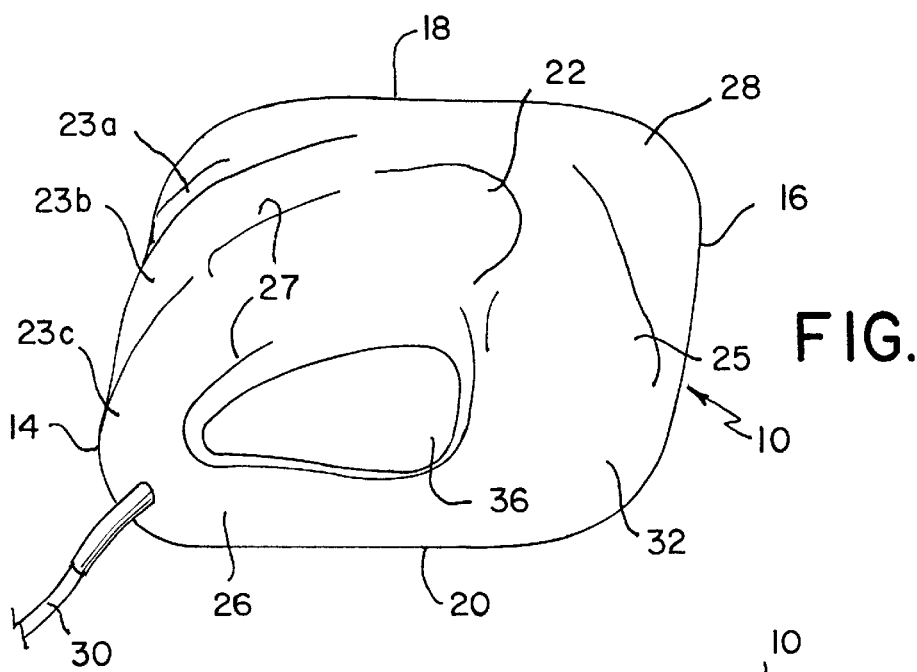
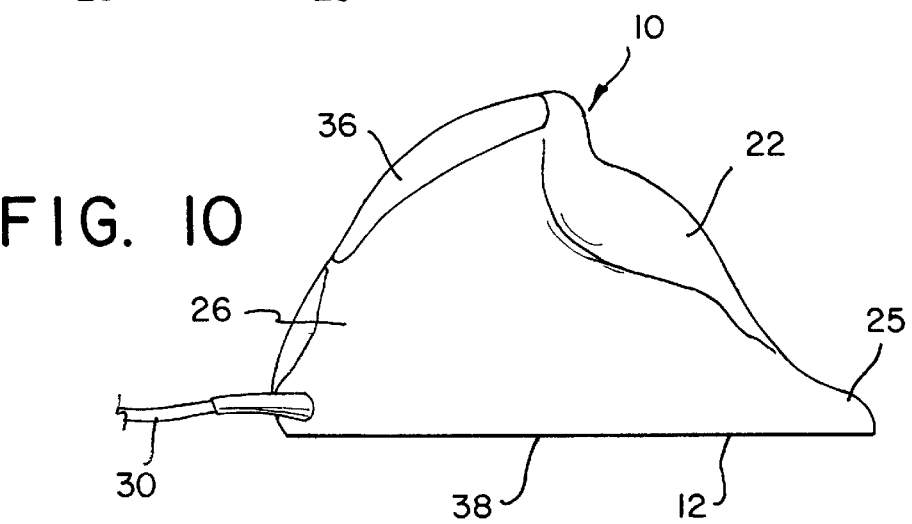

ORTHOPEDIC COMPUTER MOUSE

This application is a continuation of application Ser. No. 09/325,001, filed Jun. 2, 1999.

BACKGROUND OF THE INVENTION

1. Field of the Invention

This invention relates generally to computer peripherals, and more particularly, to an orthopedic mouse designed to prevent diseases associated with the use of the computer mouse (e.g. tendinitis, bursitis, and carpal tunnel syndrome).

2. Brief Description of the Prior Art

Computer cursors are generally controlled by a manually manipulated pointing device connected to a computer, such as a mouse, trackball, touch pad, digitizing tablet or the like. The mouse includes a housing that is moved on a flat, stationary surface. The housing contains a motion sensor on its bottom side for tracking movement of the mouse, either as a single button or a plurality of buttons on or near the front edge thereof, and circuitry for electrically communicating with an attached computer. When the mouse is moved on a support surface, the cursor moves in a corresponding direction. When the buttons are pressed, certain actions can be performed, depending on the software application using the mouse. The internal components and electrical and software operations of computer mice are well known in the art.

Typical computer mice, such as the one shown in U.S. Pat. No. D302,426 to Bradley et al., are substantially wider than they are tall, and have generally symmetrical sides so that they can be used by either the right or the left hand. Some mice are specially shaped for providing an optimal fit for a user's right hand. The mouse shown in U.S. Pat. No. D328,597 to Clouss, and sold under the trademark "Mouse-Man" by Logitech Inc. in Fremont, Calif., has a slightly angled but generally horizontal top surface for supporting the fingers and palm of a right hand. The Microsoft Mouse, Version 2, sold by Microsoft Corporation in Redmond, Wash., includes a concave left side for closely engaging the base of the thumb and palm of a right hand. The mouse shown in U.S. Pat. No. 4,862,165 to Gart includes a surface for supporting some fingers in substantially curled positions. Some ergonomic mice, including the Logitech MouseMan™, are also made in left-handed versions.

Most prior art mice have a generally horizontal, primary supporting surface for supporting a hand in a horizontal position, as exemplified by the drawing figures of U.S. Pat. No. 5,157,381 to Cheng, and the drawings in the user's manual of the Microsoft Mouse. However, such prior art mice force the hand, wrist, and forearm to be twisted 80 to 90 degrees out of their natural and relaxed positions, and require constant muscular force to be applied to the hand, wrist, and forearm to maintain their positions. For a three-button mouse, the fore, middle, and ring fingers must be kept in constant tension to prevent them from resting too heavily on the buttons and depressing them inadvertently. A horizontal hand holding a prior art mouse is supported on the desk by only a small area at the wrist on the little finger side, so that a pressure sore may develop thereon. The total effort and discomfort may not seem great at first, but when these mice are used over a prolonged and continuous period of time, users may get diseases associated with the use of the computer mouse (e.g. tendinitis, bursitis, and carpal tunnel syndrome), experience fatigue, discomfort, and even pain in the hand and wrist.

U.S. Pat. No. 5,576,733 discloses an ergonomic computer mouse which includes an upright, primary finger supporting surface for supporting all of the fingers of an upright hand in straight positions in an upright stack. An opposite thumb-supporting surface is provided for supporting the thumb. This arrangement ostensibly provides greater comfort. However, neither the mouse disclosed in the '733 Patent, nor any other existing computer mice will support the hand in the optimal "position of function" (also referred to as the "physiological position") in which the musculature of the hand and forearm are at total rest. Maintaining the hand in a "pincer" position to support both the hand and the forearm in a vertical position requires effort.

A detailed discussion of the "position of function" may be found in, for example, THE HAND, Volume II, Chapter 53, pp.497–501, 1985, published by W. B. Saunders Company, the disclosure of which is hereby incorporated by reference as though fully set forth herein. The position of function relates to the position of the hand at rest, which assumes a certain position. This is largely a mid-position of the range of motion of each and every joint, including the wrist, and rotation of the forearm. The forearm is halfway between pronation and supination. The wrist is in about 20° of dorsiflexion and 10° of ulnar flexion. The fingers are slightly flexed in each of their joints, the index being flexed least and the little finger being flexed the most. The thumb is forward from the hand in partial opposition and its joints are also partially flexed. A more precise description of the position of function can be made with regard to the thumb. In this position, the angle between the first and second metacarpal is about 45°. Each and every "position of function" must endeavor to bring together a number of favorable conditions that are not always compatible with each other. They are those that place the joints in a position in which grasp is easy, in which stiffness is less likely to occur, and, finally, in which eventual stiffness will permit preservation of movements of small aptitude, in a useful range. To that concept we add a concept from the medical field: a position of work used during a prolonged period constitutes a form of immobilization (in function). "There does not exist a 'position of function' in immobility; the function of the hand necessarily involves movement." THE HAND, Vol. II, Chapter 53 at 501.

SUMMARY OF THE INVENTION

In accordance with the above, it is an object of the present invention to provide an orthopedic computer mouse that is shaped to allow a hand holding it to remain in physiological position or position of function, i.e., a natural, untwisted, and relaxed position.

It is another object of the present invention to provide an orthopedic computer mouse that is designed to prevent diseases (e.g. tendinitis, bursitis, and carpal tunnel syndrome), and that minimizes or eliminates fatigue, discomfort, and pain even after prolonged and continuous use.

It is still another object of the present invention to provide an orthopedic computer mouse that may be sized to fit an individual user based upon the user's hand measurements.

It is yet another object of the present invention to provide an orthopedic computer mouse which may be provided in both right and left-handed versions.

It is still another object of the present invention to provide an orthopedic computer mouse which is "innocuous," i.e., a computer mouse which has no adverse effect on, or which is harmless to the user.

In accordance with the above objects and additional objects that will become apparent hereinafter, the present invention provides an orthopedic computer mouse which can be translated over a support surface, the mouse adapted for supporting the hand in the "position of function" or "physiological position." The form of the orthopedic mouse in accordance with the invention has been developed from an imprint of the human hand realized in the position of function. The mouse comprises a bottom surface, a forward end, a rear end, and opposite sides, and a generally hemispherical surface for supporting the fingers of a hand in a generally elevated orientation relative to the support surface with the little finger located at a first elevation and the index finger located at a second elevation higher than the first elevation relative to the bottom surface. The generally hemispherical surface is further adapted for supporting the hollow of the hand so that the hand rests at an angle of forty-five degrees with respect to the support surface (i.e. the table) and with respect to the forearm in semipronation (i.e. half way between pronation and supination). The general hemispherical finger-supporting surface extends upwardly and laterally from one of the opposite sides. A thumb-supporting surface is provided for supporting the thumb of the hand, so that the mouse is securely gripped between the thumb and the fingers where the thumb supporting surface is disposed opposite the generally hemispherical finger-supporting surface without effort. The generally hemispherical finger-supporting surface and the thumb-supporting surface cooperate such that the hand is supported in the physiological position on the mouse. This aspect, which is an important part of the position of function, is the most characteristic quality of the human hand. The work of the hand in opposition is characteristic of humans and must be preserved at all costs.

In the preferred embodiment, the generally hemispherical surface merges into a hypothenar depression for supporting the hypothenar eminence of the hand, and a thenar depression for supporting the thenar eminence of the hand. Between the two eminences (thenar and hypothenar) exists a depression. Its corresponding and complementary form is shown with the eminence that we will call "posterior prolongation" and that is depicted in the appended drawings and described in greater detail below. A raised fork is disposed above the generally hemispherical surface for placing the fingers of the hand into a pincer position.

BRIEF DESCRIPTION OF THE DRAWINGS

In accordance with the above, the present invention will now be described in detail with respect to the accompanying drawings:

FIG. 8 is a right side elevational view of an orthopedic mouse in accordance with the invention;

FIG. 9 is a top plan view thereof;

FIG. 10 is a left side elevational view thereof;

DETAILED DESCRIPTION OF THE PREFERRED EMBODIMENT

Referring now to the several views of the drawings, there is depicted an orthopedic computer mouse in accordance with the present invention.

Figure 1:
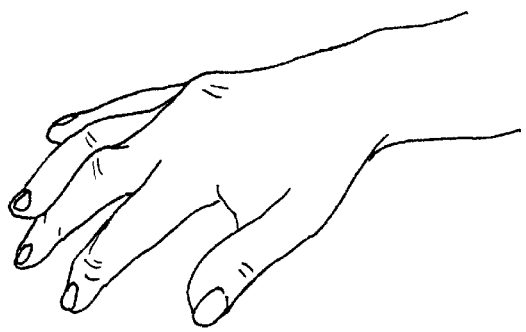
FIG. 1 is an illustration of the hand in the forced position (pronation) when using an ordinary mouse.
Figure 2:
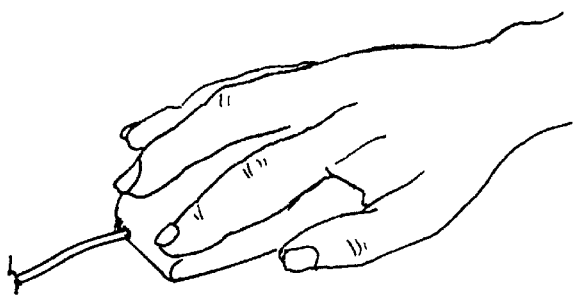
FIG. 2 is an illustration of the hand grasping an ordinary mouse in the forced position.
Figure 3:
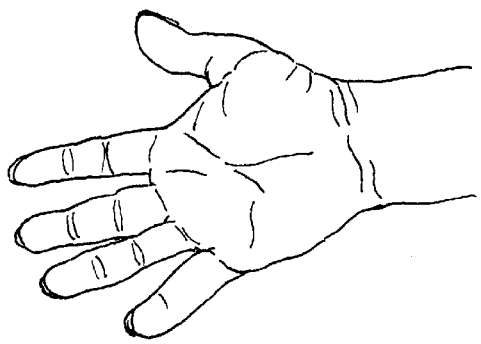
FIG. 3 is an illustration of the hand in the opposite position (supination) to that shown in FIG. 1.
Figure 4:
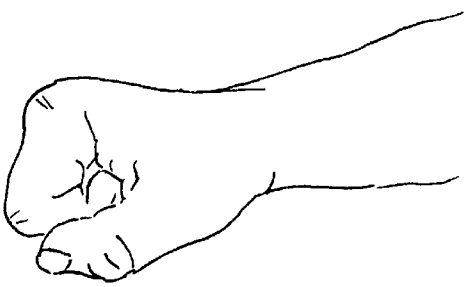
FIG. 4 is a view of the hand in flexion.
Figure 5:
FIG. 5 is a view of the hand in extension.
Figure 6:
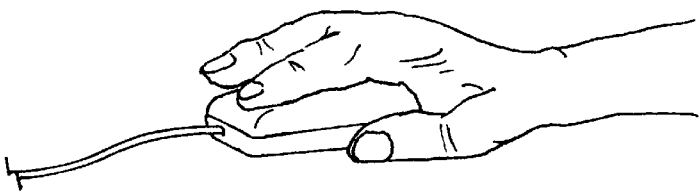
FIG. 6 is a view of the hand in extension when using an ordinary mouse.

FIG. 1 depicts the hand in pronation, the forced position which is used with an ordinary mouse (FIG. 2). FIG. 3 is the hand in supination, the opposite of the position shown in FIGS. 1 and 2. FIG. 4 shows the hand in flexion, with effort of the flexor muscle groups. FIG. 5 depicts effort of the extensor muscle groups when the hand is in extension. FIG. 6 depicts use of an ordinary mouse with the hand extended.

Figure 7A:
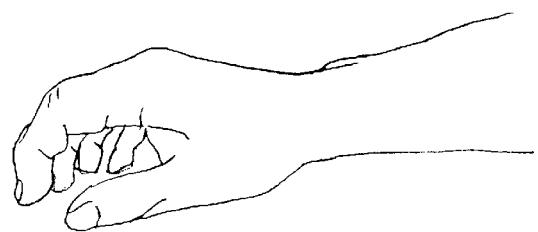
FIG. 7a is a view of the hand in the physiological position.
Figure 7B:
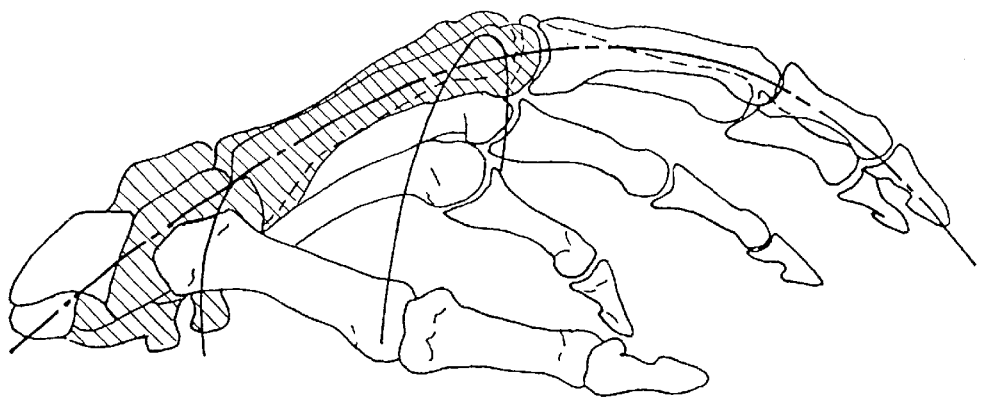
FIG. 7b is a view of the arches of the hand.
Figure 7C:
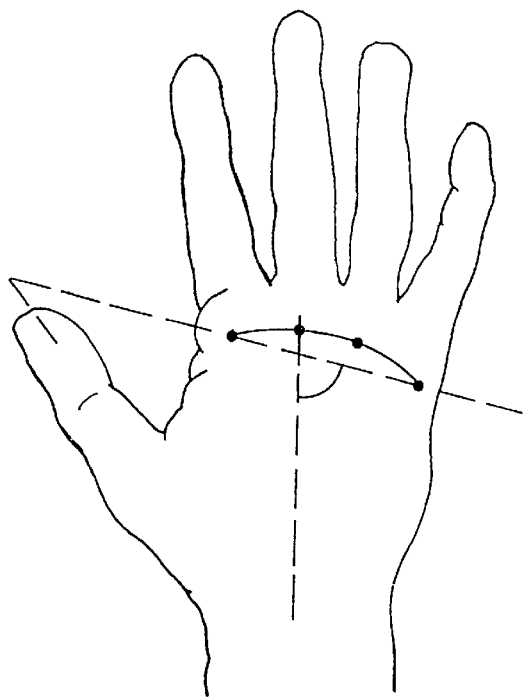
FIG. 7c is a view of the obliquity of the transverse axis of the palm.
Figure 7D:
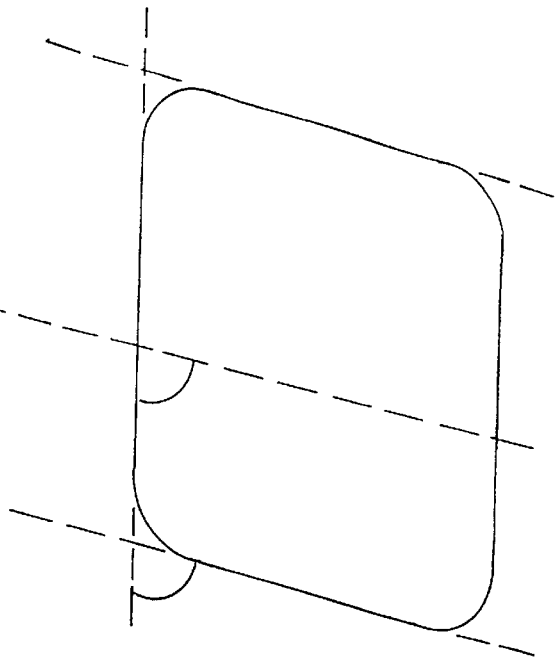
FIG. 7d is an outline of the planform of the orthopedic mouse in accordance with a preferred embodiment of the invention.
Figure 11:
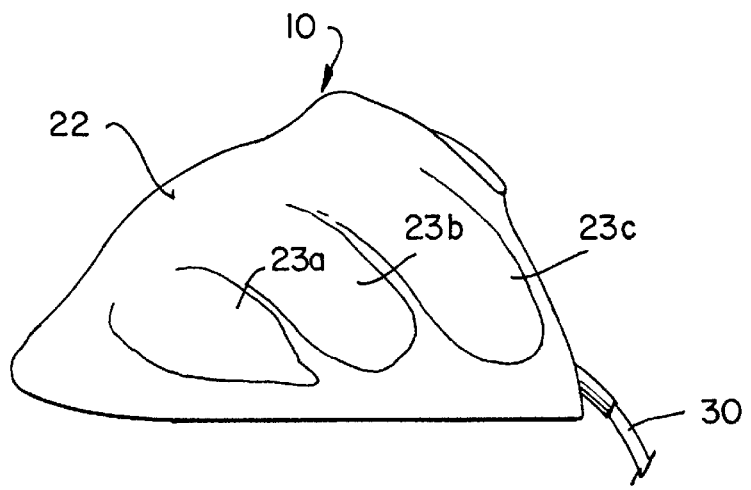
FIG. 11 is a front elevational view thereof.
Figure 12:
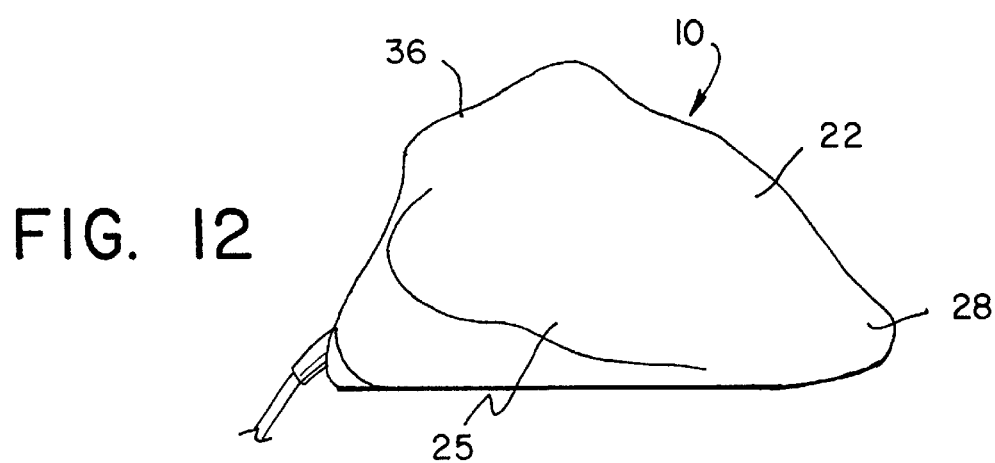
FIG. 12 is a rear elevational view thereof.
Figure 13:
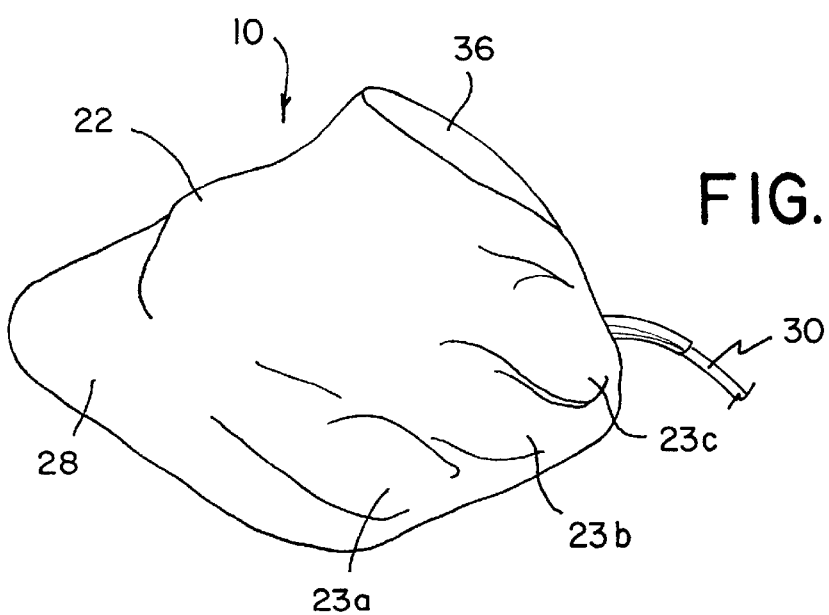
FIG. 13 is an outer frontal view (at 45 degrees)
Figure 14:
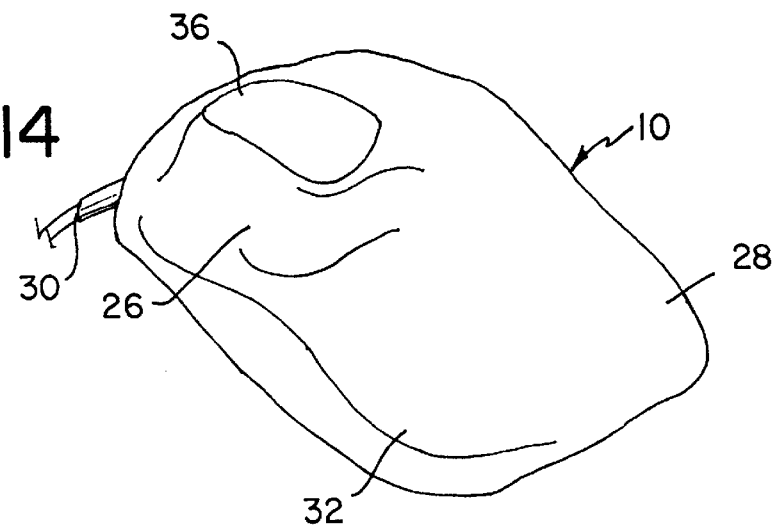
FIG. 14 is an inside rear view (at 45 degrees)
Figure 15:
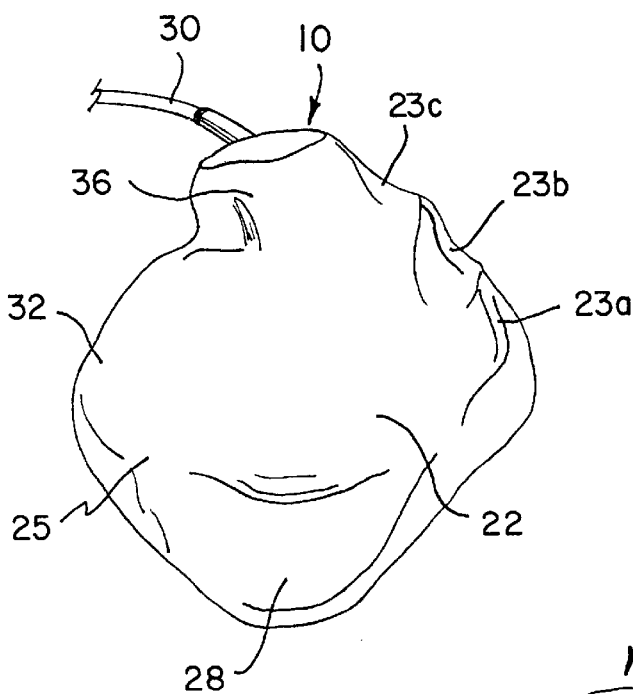
FIG. 15 is a outside rear view (at 45 degrees)
Figure 16:
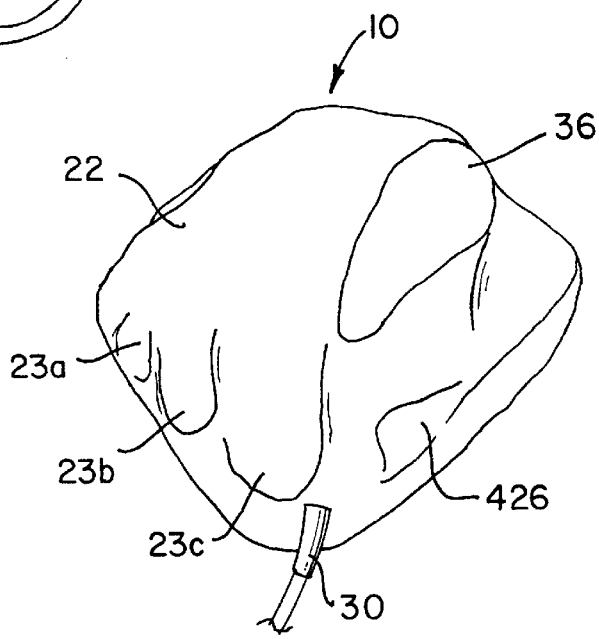
FIG. 16 is an inside front view (at 45 degrees)

FIG. 7a depicts the hand in the "physiological position" or "position of function." The "position of function" is discussed in THE HAND, Volume II, Chapter 53, pp.497–501, 1985, published by W.B. Saunders Company, the disclosure of which is hereby incorporated by reference as though fully set forth herein. The skeleton of the hand has a transverse and longitudinal (i.e., double) concavity which gives it the shape of a cup with a palmer concavity as depicted in FIG. 7b. It is essential to the grasping function of the hand that these concavities be preserved. The generally hemispherical surface 22 ensures that the proper position will be maintained. As shown in FIG. 7c, the transverse axis lies obliquely, being more distal at the metacarpophalangeal joint of the index finger and more proximal at the metacarpophalangeal joint of the fifth finger. An angle of approximately 75 degrees is formed with the longitudinal axis, angle which is also present in the general shape of the invention. It is important to note that the forward and rear ends of the orthopedic mouse are disposed at the same angle relative to the sides as shown schematically in the planform of FIG. 7d and FIG. 9. The position of function relates to the position of the hand at rest, which assumes a certain position. This is largely a mid-position of the range of motion of each and every joint, including the wrist, and rotation of the forearm. The forearm is halfway between pronation and supination. The wrist is in about 20° of dorsiflexion and 10° of ulnar flexion. The fingers are slightly flexed in each of their joints, the index being flexed least and the little finger being flexed the most. The thumb is forward from the hand in partial opposition and its joints are also partially flexed. A more precise description of the position of function can be made with regard to the thumb. In this position, the angle between the first and second metacarpal is about 45°. There are numerous ways to describe the "position of function"

which may lead one to think that more than one "position of function" exists. THE HAND, Vol. II, Chapter 53 at 494. Each and every "position of function" must endeavor to bring together a number of favorable conditions that are not always compatible with each other. They are those that place the joints in a position in which grasp is easy, in which stiffness is less likely to occur, and, finally, in which eventual stiffness will permit preservation of movements of small aptitude, in a useful range.

Figure 19:
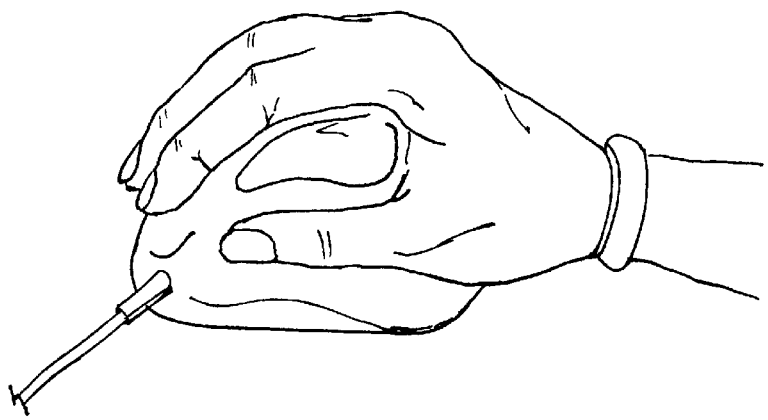
FIG. 19 is a top plan view of the hand grasping the orthopedic computer mouse in accordance with the present invention.

The orthopedic computer mouse 10 in accordance with the invention allows the hand to remain in the "position of function" during use. Referring now to FIGS. 8–16, orthopedic computer mouse 10 comprises a bottom surface 12, a forward end 14, a rear end 16, and opposite sides 18, 20. The forward and rear ends 14 and 16, respectively, are disposed at an angle of approximately 75 degrees relative to sides 18 and 20 as shown schematically in the planform of FIGS. 7d and 9. The above mentioned 75 degree angle is present in the general shape of the invention. A generally hemispherical surface 22 is provided for supporting the fingers of a hand in an elevated orientation relative to the support surface with the little finger located at a first elevation and the index finger located at a second elevation higher than the first elevation relative to the bottom surface 12. The generally hemispherical surface 22 blends into an extension 25 for supporting the hollow of the hand so that the hand rests at an angle of forty-five degrees with respect to the supporting surface as shown in FIG. 7. The general hemispherical finger-supporting surface 22 extends upwardly and laterally from one of the opposite sides 18. A plurality of control buttons 23a, 23b, 23c are disposed proximal to the forward end 14. Although shown with three buttons, the orthopedic computer mouse 10 can be provided with any number of control buttons, or just a single button if desired. A plurality of contiguous raised ridges 23 may be integrally formed with surface define 22 to depressions to accommodate the fingers. A thumb-supporting surface 26 is provided for supporting the thumb of the hand, so that the mouse is securely gripped between the thumb and the fingers as shown remaining in rest w/o effort. The thumb supporting surface 26 is disposed opposite the generally hemispherical finger-supporting surface 22. The thumb supporting surface 26 may be defined as a depression for holding the thumb against downward movement toward the side edge 20. The generally hemispherical finger-supporting surface 22 and the thumb supporting surface 26 cooperate such that the hand being supported rests at an angle of forty-five degrees with respect to the support surface in a physiological relaxed, untwisted, and naturally upright position (FIGS. 7 and 19).

In the preferred embodiment, the generally hemispherical surface 22 merges into a hypothenar depression 28 for supporting the hypothenar eminence of the hand, and thenar depression 32 for supporting the thenar eminence of the hand. A raised fork 36 is disposed above the generally hemispherical surface for placing the fingers of the hand into a pincer position. This aspect, which is an important part of the position of function, is the most characteristic quality of the human hand. The work of the hand in opposition is characteristic of humans and must be preserved at all costs The entire hand supporting surface(s) of the orthopedic computer mouse 10 may be sized to fit a particular user based upon measurements of the hand taken from a hand imprint or the like. In this manner, distortion of the fingers and other parts of the hand is prevented.

The flat bottom side of the mouse may be provided with feet (not shown) made of a conventional low-friction material, such as Teflon™, and a motion sensor 38 for sensing the movement of the mouse over the stationary surface or desk. In the example shown, motion sensor 38 is a conventional ball-type device well known in the art, although other types of suitable motion sensors can also be used. An electrical cable 30 communicates electrical signals between orthopedic computer mouse 10 and the computer (not shown).

Figure 17:
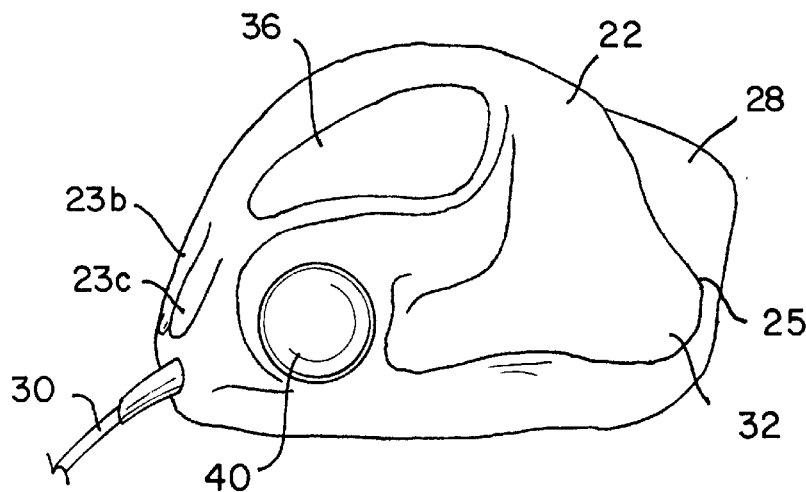
FIG. 17 is an inside lateral view (at 45 degrees) of a track ball embodiment.
Figure 18:
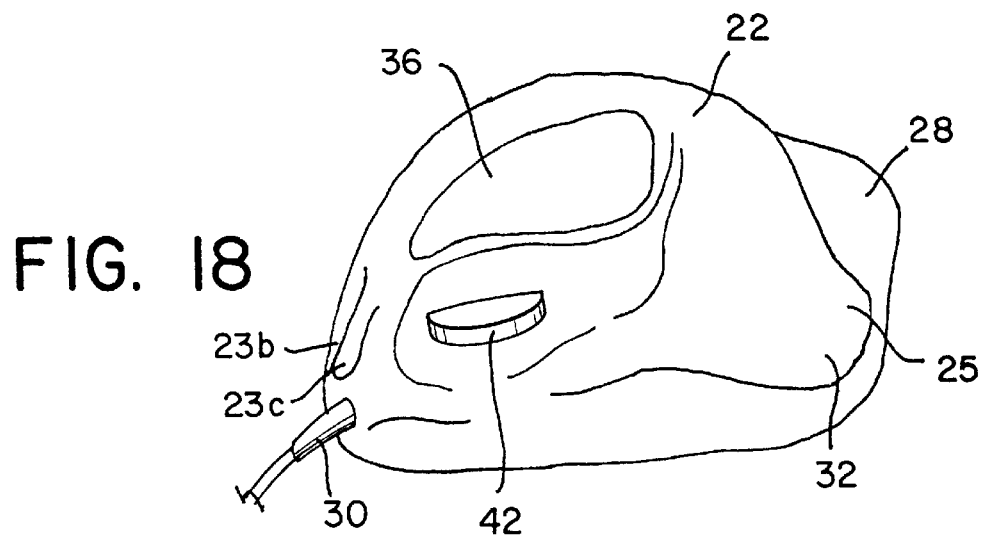
FIG. 18 is a top inside lateral view (at 45 degrees) of an "Internet Search Wheel" embodiment.

FIG. 17 depicts an alternative embodiment in which a screen search ball 40 is provided in the thumb area. The search ball 40 communicates with conventional circuitry of the type well known in the art. This arrangement eliminates the need to physically displace the orthopedic computer mouse 10; cursor control is effected solely by manipulating the search ball 40. FIG. 18 shows another embodiment having an Internet search wheel 42 in the thumb support area. It is also possible to provide an additional button located on the thumb supporting surface 26 for any desired function.

Unlike prior art mice, which are held with a horizontal hand as shown in FIGS. 2 and 6 generally parallel to a desk, the orthopedic computer mouse is held with the hand in the physiological position in a generally upright, relaxed orientation as shown in FIG. 19. When held in this manner, orthopedic computer mouse 10 mouse can be moved a long distance by moving the hand and arm together, or the orthopedic computer mouse 10 can be precisely manipulated into position by just flexing the fingers and the thumb.

The upright shape of the orthopedic computer mouse 10 allows the hand to remain in a relaxed and naturally upright position. It eliminates the substantial twisting of the hand, wrist, and forearm that are common to users of prior art mice. The weight of the upright hand is distributed along the entire lower edge and the thenar and hypothenar supports act to eliminate pressure-sores on the wrist, which are often caused by prior art mice. Anatomically, those areas (thenar, hypothenar, and fingertips) are cushioned exactly because they are support areas by nature. As a result, this physiological position minimizes or eliminates fatigue, discomfort, and pain, even after long periods of continuous use, and rids the user of diseases. Located between the two eminences (thenar and hypothenar) exists a depression. Its corresponding and complementary form is shown with the eminence that we will call "posterior prolongation" and that is depicted in the FIGS. 8–10 and 15 as reference numeral 25. Finally, the orthopedic computer mouse 10 can be formed in both right and left-handed versions depending upon the preference of the user.

The present invention has been shown in what is considered to be the most practical and preferred embodiment. It is anticipated, however, that departures may be made therefrom and that obvious modifications will be implemented by persons skilled in the art.

What is claimed is:

1. An orthopedic computer mouse which can be translated over a support surface, the mouse adapted for supporting the hand in the physiological position, comprising:

a bottom surface, a forward end, a rear end, and opposite sides;

a generally hemispherical surface for supporting the fingers of a hand in a generally elevated orientation with the little finger located at a first elevation and the index finger located at a second elevation higher than said first elevation relative to said bottom surface, said generally hemispherical surface further adapted for supporting the hollow of the hand so that the hand rests at an angle with respect to the forearm in the physiological position, said general hemispherical finger-supporting surface extending upwardly and laterally from one of said opposite sides; and a thumb-supporting surface for supporting the thumb of said hand, so that said mouse is securely gripped between the thumb and the fingers, said thumb supporting surface being disposed opposite said generally hemispherical finger-supporting surface, said generally hemispherical finger-supporting surface and said thumb supporting surface cooperating to place the hand in the physiological position.

2. The orthopedic computer mouse recited in claim 1, wherein said generally hemispherical surface merges into a depression for supporting the hypothenar eminence of the hand, and a thenar depression that supports the thenar eminence of the hand, between said eminences a depression being defined as a posterior prolongation.

3. The orthopedic computer mouse recited in claim 1, further comprising a raised fork disposed above said generally hemispherical surface for placing the fingers of the hand into a pincer position.

4. The orthopedic computer mouse recited in claim 1, wherein said bottom surface, forward end, rear end, and opposite sides define a trapezoidal shape when viewed in planform.

5. The orthopedic computer mouse recited in claim 1, further comprising a screen search input device disposed relative to the thumb-supporting surface for manual manipulation by the thumb of the user.

6. The orthopedic computer mouse recited in claim 1, further comprising one or more buttons disposed relative to said generally hemispherical hand supporting surface to engage the fingers of the hand when said hand is supported on said generally hemispherical hand supporting surface.

7. An orthopedic computer mouse which can be translated over a support surface, the mouse adapted for supporting the hand in the physiological position, comprising:

a bottom surface, a forward end, a rear end, and opposite sides;

a generally hemispherical surface for supporting the fingers of a hand in a generally elevated orientation with the little finger at a first elevation and the index finger located at a second elevation higher than said first elevation relative to said bottom surface, said generally hemispherical surface further adapted for supporting the hollow of the hand so that the hand rests at an angle with respect to the forearm in the physiological position, said general hemispherical finger-supporting surface extending upwardly and laterally from one of said opposite sides, and said generally hemispherical surface merging into a depression for supporting the hypothenar eminence of the hand, and a thenar depression that supports the thenar eminence of the hands, and a thumb-supporting surface for supporting the thumb of said hand, so that said mouse is securely gripped between the thumb and the fingers, said thumb supporting surface being disposed opposite said generally hemispherical finger-supporting surface, said generally hemispherical finger-supporting surface and said thumb supporting surface cooperating to place the hand in the physiological position.

* * * * *